United States Patent
Haun

(12) 
(10) Patent No.: US 6,340,650 B1
(45) Date of Patent: Jan. 22, 2002

(54) CERAMIC PRODUCTS MADE FROM WASTE GLASS, RAW BATCH FORMULATIONS, AND METHOD

(76) Inventor: Michael Joseph Haun, 5819 La Cuesta Dr., Santa Rosa, CA (US) 95409

( * ) Notice: Subject to any disclaimer, the term of this patent is extended or adjusted under 35 U.S.C. 154(b) by 0 days.

(21) Appl. No.: 09/494,968

(22) Filed: Jan. 31, 2000

Related U.S. Application Data

(60) Provisional application No. 60/118,313, filed on Feb. 2, 1999.

(51) Int. Cl.[7] .......................... C03C 10/00; C03B 19/06
(52) U.S. Cl. .............................. 501/155; 501/2; 501/5; 501/32; 65/173; 65/134.8; 65/144
(58) Field of Search ................................ 501/2, 5, 155, 501/32; 65/17.3, 134.8, 144

(56) References Cited

U.S. PATENT DOCUMENTS

| | | | |
|---|---|---|---|
| 3,963,503 A | | 6/1976 | Mackenzie |
| 3,963,506 A | | 6/1976 | Shutt et al. |
| 4,271,109 A | | 6/1981 | Boyce |
| 5,028,569 A | * | 7/1991 | Cihon .......................... 501/32 |
| 5,244,850 A | | 9/1993 | Dutton |
| 5,536,345 A | | 7/1996 | Lingart |
| 5,583,079 A | | 12/1996 | Golitz et al. |
| 5,649,987 A | | 7/1997 | Greulich |
| 5,792,524 A | | 9/1998 | Lingart et al. |
| 5,830,251 A | * | 11/1998 | Simpson et al. ............. 65/17.3 |
| 5,895,511 A | | 4/1999 | Tikhonova |

OTHER PUBLICATIONS

I.W.M. Brown et al., "Process Design for the Production of a Ceramic–Like Body from Recycled Waste Glass", J. of Materials Science, vol. 17, pp. 2164–2193, 1982. No month.

N.M.P. Low, "Fabrication of Cellular Structure Composite Material form Recycled Soda–Lime Glass and Phlogopite Mica Powders," J. of Materials Science, vol. 15, pp. 1509–1517, 1980. No month.

W. Liu, "Sintered Mosaic Glass from Ground Waste Glass," Glass Technology, vol. 32, No. 1, pp. 24–27, 1991. No month.

* cited by examiner

*Primary Examiner*—Karl Group
(74) *Attorney, Agent, or Firm*—Jack Lo

(57) ABSTRACT

The invention provides a method to transform large quantities of waste glass into useful ceramic products by a low-cost manufacturing process. The major steps of the method consist of dry preparation of glass powder, granulation with a non-aqueous organic binder system, dry pressing with adequate green strength, and firing at low temperatures. Water and clay are not required in the processing, which eliminates problems that were encountered in the past. Only one firing step is needed with a low peak firing temperature of about 750° C. The method conserves energy and natural resources compared to clay-based traditional ceramic manufacturing. High-quality impervious ceramic products with only a small amount of porosity can be produced by the invention.

21 Claims, No Drawings

CERAMIC PRODUCTS MADE FROM WASTE GLASS, RAW BATCH FORMULATIONS, AND METHOD

CROSS REFERENCE TO RELATED APPLICATIONS

I claim the benefit of provisional application No. 60/118,313 which was filed on Feb. 2, 1999.

BACKGROUND OF THE INVENTION

The invention is directed to ceramic products made from waste glass; raw batch formulations for making ceramic products from waste glass; and a method for making ceramic products from waste glass. Examples of ceramic products that can be made by the invention are tile and brick, but other ceramic products can also be made. The invention addresses two current problems: energy usage by the ceramic industry needs to be reduced; and new recycled-glass products are needed.

The ceramic industry consumes large amounts of energy, especially during the firing process. Firing temperatures greater than 1200° C. (2200° F.) are required to sinter typical ceramic raw materials into dense products. Modifications of the raw material formulations have led to reductions in firing temperatures, but the improvements are limited because of the types of raw materials used. Most traditional ceramic products, such as tile and brick, consist mainly of clay-based raw materials, which inherently require high firing temperatures. Other ceramic manufacturing steps, such as the drying processes, are also very energy intensive. Energy costs are a major portion of the total manufacturing costs, and thus new methods to reduce the amount of energy required will be a great benefit to the ceramic industry.

New products utilizing recycled waste glass are needed to further promote glass recycling, because only a limited amount of glass can be remelted to make new containers (currently the primary use of recycled glass). New products are especially needed that are less sensitive to contaminants in the glass, and that can be made from green or mixed-color waste glass. Research has been conducted and products developed using recycled glass as a ceramic raw material. However, processing problems have limited the developments, so that only a negligible amount of waste glass is currently utilized (excluding remelting to form new glass products). These problems occur because of inherent chemical and processing incompatibilities with traditional ceramic raw materials and manufacturing methods. These incompatibilities have greatly hampered the development of ceramic products from waste glass.

Waste glass in the invention refers to any industrial or post-consumer glass that is discarded. Any form of glass, such as containers (bottles, jars, etc.), plate glass, or fiber glass, can be used. Waste glass can be obtained from recycling companies or glass manufacturers. Most waste glass consists mainly of silicon, sodium, and calcium oxides (referred to as soda-lime glass) with other minor components, such as aluminum and magnesium oxides. Soda-lime glass compositions typically soften from about 650 to about 750° C. This unique softening behavior causes articles formed from fine powders of soda lime glass to densify by viscous-phase sintering at temperatures much lower than usually required to fire ceramic products. The invention utilizes the low-temperature densification behavior of soda-lime glass to reduce manufacturing costs by conserving energy and lowering equipment and maintenance expenses.

Water, clay, and some other common ceramic raw materials are inherently incompatible with sintering of soda-lime glass powder at low temperatures. This is because chemical species resulting from reaction of glass with water, or from decomposition of clay, volatilize in the temperature range where soda-lime glass softens. The volatile species become trapped in the densifying glass, which causes foaming and porous defects in the final product. Previous waste-glass based ceramic products have been made with the addition of water and clay. The porous defects that resulted were minimized by optimizing the processing parameters, but not eliminated. The following paragraphs describe the previous processing problems that have occurred when trying to use waste glass as a ceramic raw material.

Brown and Mackenzie [J. of Materials Science, Vol. 17, pp. 2164–2193, 1982] fabricated ceramic tile from recycled glass combined with clay and water. The fired properties were found to be greatly affected by the amount of clay and water added, because of variations in the amount of porosity that occurred. Low [J. of Materials Science, Vol. 15, pp. 1509–1517, 1980] demonstrated that special foaming agents, such as calcium carbonate, were not necessary to foam glass. The volatile species from decomposition of mica, similar to that in clays, combined with the glass-water reaction was all that was necessary to produce extreme foaming.

Liu, Li, and Zhang [Glass Technology, Vol. 32, No. 1, pp. 24–27, 1991] investigated processing recycled glass powder with organic binders and water. They reported that the binder (and water) content had to be kept low to prevent bubbling in the fired samples and "inferior chemical and physical properties." Even with low water content, the densities of the fired samples indicate that some degree of foaming occurred. This work demonstrates the adverse effects that occur from reactions between glass powder and water, even when only small amounts of water are added without the addition of clay.

Several patents involve the use of recycled glass as a ceramic raw material. Shutt and Campbell [U.S. Pat. No. 3,963,506] combined ground waste glass with clay, crushed brick, and water to produce building panels and bricks. The fired material had open porosity, and problems of warpage and bloating, indicating that adverse glass-water reactions occurred. Mackenzie [U.S. Pat. No. 3,963,503] patented a method of making glass products from ground waste glass combined with a treating agent. The work mainly concentrated on foaming glass, and is typical of how much of the research on recycled glass ended up focusing on foamed glass to take advantage of the problems that occurred.

Boyce [U.S. Pat. No. 4,271,109] received a patent for a method of manufacturing ceramic insulators for electric lamp bases from mixing 25–45% crushed scrap glass with clay and wollastonite. After firing at 1050° C., densities of 1.9 g/cc resulted, which indicates that at least 20% porosity still remained. Cihon [U.S. Pat. No. 5,028,569] patented a batch formulation and method of producing a ceramic article from 60–85% soda-lime glass cullet combined with clay, flint, and a liquid (water was used in examples). He discussed problems that occurred because of reaction of glass with water.

Dutton [U.S. Pat. No. 5,244,850] patented a building material composed of 10–50% recycled glass combined with slate particles. Two processes were described. One involved melting the recycled glass, mixing in slate particles, and then pressing the molten mixture in a mold. In the second process, slate particles with or without recycled glass were mixed with an alkali-metal silicate water solution or suspension, such as sodium silicate (water glass), pressed in a mold, dried, and fired at 920 and 1050° C. Lingart [U.S. Pat. No. 5,536,345] patented a process for manufacturing natural stone-type, panel-shaped construction and decoration materials consisting of three layers; a bottom layer of sand, middle layer of a mixture of sand and crushed glass, and a top layer of crushed glass. The glass was crushed to 2–3 mm in size and mixed with at least 5% water. The layers were deposited in a mold and fired in the mold to 600–850° C., followed by an elaborate series of holds at different temperatures and careful cooling.

Golitz et al. [U.S. Pat. No. 5,583,079] patented a ceramic tile product composed of 25–50% glass mixed with fly ash, clay, and water. This work focused on lowering the cost of the raw materials by using fly ash. The pressed green tile was glazed and then fired at 970–1025° C. Greulich [U.S. Pat. No. 5,649,987] patented a process for producing tabular building and decorative materials similar to natural stone consisting of 85–98% glass mixed with water and various other components, such as sand and inorganic pigments. The mixture was deposited in a mold and fired in the mold at 720–1100° C. A closed glossy surface resulted, however polishing the surface revealed bubbles. Lingart and Tikhonova [U.S. Pat. Nos. 5,792,524 and 5,895,511] patented processes of producing ceramic tile from mixtures of glass, sand, water, and sodium silicate (water glass) solution. The materials were pressed in a mold, and then fired in the mold by a relatively complicated procedure. The authors stated that air bubbles formed, and were kept from rising to the surface by controlling the temperature gradient between the layers during firing.

The present invention eliminates the previous processing problems discuss above. The invention is novel, because a high-quality ceramic product can be manufactured at low cost from up to 100% waste glass without requiring the addition of water and clay. The invention also conserves energy and natural resources compared to traditional ceramic processing methods. It was unexpected that the addition of water and clay would not be necessary to manufacture a low-cost ceramic product, such as tile or brick, using waste glass as a raw material. It was also unexpected that a nonaqueous organic binder system could be used to process waste glass into ceramic products with the overall manufacturing costs kept low.

BRIEF SUMMARY OF THE INVENTION

The invention provides a method to transform large quantities of waste glass into useful ceramic products by a low-cost highly-automated manufacturing process. The major steps of this method consist of dry preparation of glass powder, granulation with a non-aqueous organic binder system, dry pressing with adequate green strength, and firing at low temperatures. Up to 100 percent recycled waste glass can be used as the raw material. Water and clay are not required in the processing, which eliminates problems that were encountered in the past. An expensive spray drying step, which is traditionally needed to produce granulated powder for the pressing step, is not required. Molds to fire the ceramic products in are also not required. Only one firing step is needed with a low peak firing temperature of about 750° C. The method of the invention conserves energy and natural resources compared to clay-based traditional ceramic manufacturing.

DETAILED DESCRIPTION OF THE INVENTION

High-quality impervious ceramic products can be produced by the invention with low manufacturing costs. A ceramic microstructure with only a small amount of porosity can also be achieved. Impervious refers to ceramic products with very low water absorptions of less than 0.5%. An impervious ceramic microstructure with a small amount of porosity is critical to achieve high-quality properties. Ceramic products can be produced by the invention with a wide range of colors with smooth glossy glaze-like surfaces. The surface texture and other fired properties can also be adjusted by the addition of fillers, and/or by partial crystallization of the glass.

The raw batch formulations of the invention consist of 70–99% waste glass, 0–20% filler, and 1–10% organic binder. Preferred raw batch formulations consist of 84–99% waste glass, 0–10% filler, and 1–6% organic binder. All percentages are based on weight. It is also understood that other common ceramic processing additives, such as wetting agents, surfactants, deflocculants, coagulants, flocculants, plasticizers, antifoaming agents, lubricants, preservatives, etc. can be added to the raw batch formulation to further optimize the processing without changing the scope of the invention.

The organic binder and other organic additives (if included) will burn out during firing, and thus are not part of the final product. The waste glass and filler are inorganic components that remain after firing, and make up the final product composition. The initial raw batch formulation (given above) therefore transforms during firing to the final product composition consisting of 80–100% waste glass and 0–20% filler. The preferred final product composition consists of 90–100% waste glass and 0–10% filler. The final product composition is determined by subtracting the organic binder amount from the raw batch formulation, and then renormallizing the remaining composition to 100%.

The filler in the invention is a ceramic raw material added to modify the color, surface texture, or any other property of the final product. The addition of a filler is not necessary to make a high quality ceramic product, but may be desired to produce a specific set of properties in the final product. A wide range of filler additives can be used in the invention individually or in combination. A filler added to control the color is referred to as a colorant. A wide range of common ceramic colorants can be used to produce ceramic products by the invention with any color desired. Examples of individual oxide colorants are cobalt oxide to produce blue colors, chromium oxide for greens, and iron oxide for reds. Many commercial colorants are available based on complicated combinations of oxides which are often melted to form glass frits. In addition to the color, other properties, such as surface texture and mechanical properties, can be modified by the addition of fillers. Other examples of fillers are aluminum and zirconium oxides.

The waste glass and fillers must be in powder form to be used in the raw batch formulations. The powder particle size required depends on the final properties desired. For the invention the waste glass and filler powders have particle sizes <30 mesh (<0.6 mm). The preferred size is <100 mesh (<0.1 mm). Coarser particle size fillers can also be included in the raw batch formulations to adjust the properties of the final product. For example, coarser fillers can be added to produce a rougher surface texture to increase the coefficient of friction and slip resistance.

The organic binder in the invention consists of any organic material that can be added to bond the inorganic waste glass and filler particles together. The organic binder is initially mixed with waste glass and filler particles to form a granulated free-flowing powder. This powder is then formed into the ceramic articles. After the forming step, the organic binder provides enough strength in the unfired article for handling and transport to the firing step.

Examples of organic binders are natural gums, cellulose ethers, polymerized alcohols, acrylic resins, glycols, and waxes. Polyethylene glycol was used as the organic binder in the examples of the invention given below. Other organic binders can be used without changing the scope of the invention. To be effective the organic binder needs to be in liquid form, so that the inorganic waste glass and filler particles can be wetted and coated by the organic binder. Organic binders at room temperature (≈20° C.) are in either liquid or solid states. A solid organic binder can be dissolved in specific liquids, mixed with the inorganic powders, and then dried to remove the liquid to produce an inorganic powder coated with the organic binder. In the invention nonaqueous liquids, such as alcohols, are used to dissolve the solid organic binders. If the organic binder is in a liquid form, then an additional nonaqueous liquid is not required.

The following paragraphs describe details of each step of the method of the invention. The first step of the method consists of dry preparation of glass powder. Typical container glass bottles and jars found in municipal solid waste can be used as the starting glass to prepare the powder, but other forms of waste glass can also be used. Any color or combination of colors of waste glass can be used. The method of the present invention is not sensitive to normal levels of contaminants in the waste glass, and thus cleaning of the glass is not required. The labels on the glass do not need to be removed. The waste glass is ground into powder by two grinding steps.

The first grinding step consists of crushing the glass to <4 mesh (<5 mm) pieces. Any type of equipment commonly used to crush glass, rocks, ceramic raw materials, etc., such as a jaw or cone crusher can be used. The crushed glass is screened through a 4 mesh sieve to separate the <5 mm pieces. The larger sized pieces ($\geq$5 mm) of glass that do not pass through the sieve are circulated back into the crusher to further crush the glass until it is less than 5 mm in size. During the crushing step a dust collector is used to separate the lighter weight label particles from the glass. The label particles are discarded.

The <5 mm crushed glass is then dried in an oven to remove any moisture that may be present. Any type of oven can be used. A preferred type is a rotary drier that can be setup in a continuous process. After drying, the glass is ground in the second grinding step to reduce the size down to <30 mesh (<0.6 mm). The preferred size is <100 mesh (<0.1 mm). Several types of milling equipment can be used for this grinding step, such as a ball mill, hammer mill, vibratory mill, attrition mill, roller mill, etc. After milling, the ground glass is screened through a 30 mesh sieve (or 100 mesh for the preferred particle size). The particles that do not pass through the sieve are circulated back into the mill to be milled again. During this grinding step a dust collector is again used to separate the lighter weight label particles from the glass.

The fine glass powder (<30 or <100 mesh) that results from the two step grinding method is combined with the desired amounts of fillers and organic binder based on the raw batch formulation used. The amounts of each component are weighed on a balance, combined, and then mixed. The organic binder is added in liquid form, either because the starting binder is a liquid, or because the binder is dissolved in a nonaqueous liquid, such as an alcohol. The liquid organic binder is combined with the dry glass and filler powders preferably by spraying the liquid on the powders, but other common methods of combining the raw batch materials can also be used. The combined materials are mixed in any type of mixer that will produce a granulated free-flowing powder, such as a pan mixer, conical blender, ribbon mixer, rotating drum mixer, etc. Excess nonaqueous liquid can be removed by drying in a drier, such as a fluid bed drier, or by spray drying. However, it is preferred to keep the liquid content low enough, so that a drying step is not required.

The granulated free-flowing powder of the raw batch formulation is formed into a green ceramic article. Green here refers to the unfired ceramic. Any type of forming method can be used, but preferably dry pressing is used. For dry pressing the powder is placed in a metal die of the desired shape and pressed with rams to compact the powder. The pressed article is then removed from the die and fired in a kiln or furnace. If a nonaqueous liquid was added to dissolve the binder, then an additional drying step in an oven can be included before firing to remove any remaining liquid. Preferably, this drying step is not required, because additional liquid was either not included (a liquid binder was used), or was removed during mixing and/or forming.

The initial stage of the firing process consists of binder burnout to remove the organic binder. Preferably the binder burnout is conducted during the initial heating of the ceramic articles for firing. Separate processes of binder burnout and firing can also be used. In either case the organic binder must be completely removed prior to the softening and sintering of the glass powder to prevent defects from developing in the fired product. Organic binders typically burnout from about 200–400° C. The specific firing profile of temperature and time will depend on the raw batch formulation used. Preferably the temperature and time required are minimized, while still resulting in nearly 0% porosity. The maximum firing temperature required ranges from about 700° C. to about 800° C., and is preferably about 750° C.

The following paragraphs provide 16 examples of the invention. Most of the steps of the method are the same for each of the examples. The differences are from variations in the raw batch formulations and organic binder system used.

EXAMPLE 1

The raw batch formulation of Example 1 consisted of 94% clear glass powder and 6% organic binder (percentages based on weight). The glass powder was prepared from clear glass bottles and jars by a two step grinding process. In the first step whole glass containers were crushed in an in-house designed crushing system which involved crushing glass in a closed hard plastic chamber. The crushed glass was then sieved through 6 mesh (<3 mm). In the second step the <3 mm glass particles were dry milled in an alumina ball mill with alumina media, and then sieved through 100 mesh (<0.1 mm). The glass powder was combined with an equal amount by weight of isopropyl alcohol (99%) and 6 weight % (of the glass amount) organic binder polyethylene glycol (PEG-8000 from Union Carbide). The solution was mixed, dried in an oven at 60° C. to remove the alcohol, and sieved through 100 mesh (<0.1 mm). For each sample, approximately eight grams of the dried powder was pressed at 5,000 psi (pounds per square inch) in a one inch square metal die using a hydraulic press. The pressed articles were fired in a programmable box furnace to first burnout the organic binder, and then to sinter into dense ceramic tile. A maximum temperature of 750° C. was held for one hour. The resulting tile samples had water absorptions of <0.02%, apparent porosities of <0.04%, and densities of 2.47 g/cc (greater than 98% of the theoretical density). The samples were glossy white in color with smooth glaze-like surfaces.

EXAMPLES 2 AND 3

The same procedure described above for Example 1 was also used for these examples, except that the clear glass containers used in Example 1 were replaced by green glass bottles in Example 2 and brown glass bottles in Example 3. High quality tile resulted similar to those of Example 1, except that the Example 2 tile were green colored, and the Example 3 tile brown colored.

EXAMPLES 4–9

The same procedure described above for Example 1 was also used for these examples, except that 5% of the clear glass amount was replaced by a colorant filler. Six commercially available ceramic colorants were evaluated. Example 4 used a red colorant (Mason #6031); Example 5 an orange colorant (Mason #6121); Example 6 a green colorant (Mason #6224); Example 7 a blue colorant (Mason #6306); Example 8 a brown colorant (Mason #6109); and Example 9 a black colorant (Mason #6600). High quality tile resulted similar to those of Example 1, except that the colors of the tile corresponded to the colorant used. These examples demonstrate the ability of producing a wide range of colors by the invention.

EXAMPLES 10–15

The same procedures described above for Examples 2 and 3 were also used for these examples, except that 1% of the green or brown glass amounts was replaced by a colorant filler. The same red, green, and blue colorants were used as listed in Examples 4, 6, and 7. Example 10 combined green glass with red colorant; Example 11 green glass with green colorant; Example 12 green glass with blue colorant; Example 13 brown glass with red colorant; Example 14 brown glass with green colorant; and Example 15 brown glass with blue colorant. High quality tile resulted similar to those of the previous examples, except that additional color variations resulted. These examples further demonstrate the ability of producing a wide range of colors by the invention.

EXAMPLE 16

The same procedure described above for Example 1 was also used for this example, except that the organic binder PEG-8000 was replaced with a different polyethylene glycol (PEG-300 from Union Carbide). PEG-8000 used in Examples 1–15 was initially in a solid form, and had to be dissolved in a liquid (isopropyl alcohol was used) to wet and coat the glass particles. PEG-300 was initially in a liquid form, and so a liquid was not necessary. Six weight % PEG-300 (based on the glass amount) was combined with the glass powder without any additional liquid added. The glass and PEG-300 were mixed, and then pressed without the drying and sieving steps that were previously used after the binder addition. All other steps of Example 1 were used. High quality tile resulted similar to those of Example 1.

A detailed description of the invention with examples was described above. It is understood that various other changes and modifications can be made to the present invention by those skilled in the art without departing from the scope of the invention. For example, a glaze can also be applied to the ceramic product if desired, but is not necessary. A glaze can be applied before firing, so that only one firing is required. A glaze can also be applied after firing, but then a second firing is required.

What is claimed:

1. A method for making a ceramic product from waste glass, comprising:
   reducing the waste glass into a glass powder;
   mixing the glass powder with a nonaqueous organic binder into a glass-binder mixture;
   granulating the glass-binder mixture into granulated particles;
   forming the granulated particles into a green ceramic article;
   heating the green ceramic article to burn out the organic binder; and
   firing the green ceramic article to sinter the green ceramic article into the ceramic product.

2. The method according to claim 1, wherein the reducing of the waste glass into the glass powder comprises:
   reducing the waste glass to pieces of less than about 5 mm wide,
   drying the waste glass to remove moisture, and
   further reducing the waste glass to smaller pieces of less than about 0.6 mm wide.

3. The method according to claim 1, wherein the organic binder is provided in a liquid form.

4. The method according to claim 1, wherein 90–99 weight percent of the glass-binder mixture is comprised of the glass powder and 1–10 weight percent of the glass-binder mixture is comprised of the organic binder.

5. The method according to claim 1, wherein the firing comprises heating the green ceramic article to a maximum temperature of about 700 C. to about 800 C.

6. The method according to claim 1, wherein the firing causes partial crystallization of the ceramic product.

7. The method according to claim 1, wherein the ceramic product comprises tile or brick.

8. The method according to claim 1, wherein the ceramic product has a smooth glossy surface.

9. The method according to claim 1, wherein the ceramic product is further processed by applying a glaze thereon.

10. A method for making a ceramic product from waste glass, comprising:
    reducing the waste glass into a glass powder;
    mixing the glass powder with a filler and a nonaqueous organic binder into a glass-filler-binder mixture;
    granulating the glass-filler-binder mixture into granulated particles;
    forming the granulated particles into a green ceramic article;
    heating the green ceramic article to burn out the organic binder; and
    firing the green ceramic article to sinter the green ceramic article into the ceramic product.

11. The method according to claim 10, wherein the reducing of the waste glass into the glass powder comprises:
    reducing the waste glass to pieces of less than about 5 mm wide,
    drying the waste glass to remove moisture, and
    further reducing the waste glass to smaller pieces of less than about 0.6 mm wide.

12. The method according to claim 10, wherein the organic binder is provided in a liquid form.

13. The method according to claim 10, wherein 70–98.9 weight percent of the glass-filler-binder mixture is comprised of the glass, powder 0.1–20 weight percent of the glass-filler-binder mixture is comprised of the filler, and 1–10 weight percent of the glass-filler-binder mixture is comprised of the organic binder.

14. The method according to claim 10, wherein the filler comprises an inorganic material, excluding clays and other ceramic raw materials that produce volatile species in a softening temperature range of the waste glass.

15. The method according to claim 10, wherein the filler comprises an inorganic colorant.

16. A method according to claim 10, wherein the filler comprises coarse-sized particles added to roughen a surface texture of the ceramic product.

17. The method according to claim 10, wherein the firing comprises heating the green ceramic article to a maximum temperature of about 700 C. to about 800 C.

18. The method according to claim 10, wherein the firing causes partial crystallization of the ceramic product.

19. The method according to claim 10, wherein the ceramic product comprises tile or brick.

20. The method according to claim 10, wherein the ceramic product has a smooth glossy surface.

21. The method according to claim 10, wherein the ceramic product is further processed by applying a glaze thereon.

* * * * *